United States Patent [19]

Jaquith et al.

[11] 4,296,140
[45] Oct. 20, 1981

[54] MOLDED GELLED PIMIENTO BODY

[75] Inventors: Jack B. Jaquith, Modesto; Allen R. Church, Madera, both of Calif.

[73] Assignee: Tri/Valley Growers, San Francisco, Calif.

[21] Appl. No.: 153,220

[22] Filed: May 27, 1980

Related U.S. Application Data

[63] Continuation-in-part of Ser. No. 775,556, Mar. 8, 1977, abandoned, and Ser. No. 946,115, Sep. 27, 1978, abandoned.

[51] Int. Cl.$^3$ ............................................... A23L 1/04
[52] U.S. Cl. .................................. 426/575; 426/276; 426/102; 426/573; 426/282
[58] Field of Search ............... 426/573, 575, 578, 98, 426/102, 276, 282; 526/3

[56] References Cited

U.S. PATENT DOCUMENTS

| | | | |
|---|---|---|---|
| 2,791,508 | 8/1952 | Rivoche | 426/575 |
| 3,362,831 | 1/1968 | Szczesniak | 426/575 |
| 4,006,256 | 2/1977 | Kyros | 426/102 |
| 4,141,287 | 2/1979 | Becker et al. | 426/92 |

OTHER PUBLICATIONS

Research Disclosure, (6/75), No. 134, 3427.
Whistler et al., Industrial Gums, 1959, Academic Press, N.Y. and London, pp. 55–57 and 72–74.

Primary Examiner—Joseph M. Golian
Assistant Examiner—Elizabeth A. Hatcher
Attorney, Agent, or Firm—Edward B. Gregg

[57] ABSTRACT

Reconstituted pimiento material in ribbon form suitable for supplying to an automatic machine which pits olives, severs the ribbon into successive segments, folds each segment and stuffs the folded segment into the cavity of a pitted olive, such pimiento material comprising macerated pimiento flesh, an alginate (preferably predominating in mannuronic acid) and a starch and/or a gum (preferably both starch and a gum) and having a pH less than about 4.5, preferably not greater than about 4.0. The ribbon resulting from gelling and curing this material is dimensionally stable, has a good mouth feel, has a strength sufficient to allow storage, handling and folding 180° and has a resilient quality which ensures secure retention in the cavities of stuffed olives.

10 Claims, 11 Drawing Figures

Fig_9

Fig_10

Fig_11

MOLDED GELLED PIMIENTO BODY

This application is a continuation-in-part of our copending application, Ser. No. 775,556, filed Mar. 8, 1977 entitled "FOOD MATERIAL SUITABLE FOR FORMING INTO A STRIP OR RIBBON AND RESULTING RIBBON" and of our co-pending application Ser. No. 946,115, filed Sept. 27, 1978 entitled "FOOD MATERIAL SUITABLE FOR FORMING INTO A STRIP OR RIBBON AND RESULTING RIBBON", both of which are abandoned.

This invention relates to a pimiento material suitable for stuffing olives. As will become apparent the material is suited for forming into a continuous ribbon to be supplied to an olive pitting and stuffing machine.

In past practice, olive stuffing material has been prepared by flame peeling pimiento from which seeds and stems have been removed, then curing in brine, then laying the processed pimiento out flat and cutting it into suitable strips which are then stuffed into the cavities of pitted olives by hand. Such procedure is extremely expensive.

More recently olive pitting and stuffing machines (hereafter referred to as olive stuffing machines) have been available which avoid the hand labor required by older traditional methods but which require a pimiento feed material in the form of a continuous ribbon which is fed continuously to the stuffing machine, cut into strips of suitable size and folded and stuffed into the pitted olives.

For that purpose a ribbon is required which has the desired pimiento flavor and color and which is strong enough to resist tearing during handling and feeding to a stuffing machine yet which is not so tough as to be offensive to the feel or taste of the consumer. Further, the ribbon should be uniform in thickness and width, otherwise folded strips of the ribbon, as cut and folded by the stuffing machine, will be overly large (hence will not stuff properly) or overly small (hence will be loose in the cavities of the pitted olives). Faulty ribbon leads to an unacceptable proportion of rejected stuffed olives. It is also desirable that the stuffing not deteriorate upon storage in brine such as used for packing olives.

There has been provided a pimiento ribbon which, to the best of our knowledge, is prepared by reconstituting (i.e., by adding water to) dehydrated pimiento, then forming into a ribbon with the aid of sodium alginate, starch, a gum and calcium chloride. However, this ribbon lacks the uniformity required for stuffing olives and is presently very expensive.

Another reconstituted pimiento material for stuffing olives and a method of making the same are described in Kyros U.S. Pat. No. 4,006,256. According to the Kyros patent an aqueous dispersion of pimiento material and an alginate predominating in L-guluronic is shaped and exposed to a calcium chloride solution at a rather high pH, preferably near neutral and it requires exposure for a considerable period of time, for example, ½ to 2 hours to the calcium chloride solution.

Webster U.S. Pat. No. 3,932,673 provides a reconstituted pimiento stuffing prepared from pureed pimiento and low methoxyl pectin and requires fermentation of the stuffing material in the olive to remove residual sugars.

A recently issued patent, Gonzales U.S. Pat. No. 4,168,325, assigned to Medina Garvey Aceitunas, S.A. represents another effort to produce reconstituted pimiento material for stuffing olives. In accordance with this patent, oven-peeled pimiento is comminuted and the resulting pimiento material, after desalting if it is prepared from pimiento material that has preserved in salt solution, is homogenized with sodium alginate, guar gum, potassium sorbate (a preservative) and water. Air is removed and the paste is spread on a belt and submerged in a calcium chloride bath. The hardened sheet is cut in half to produce ribbon of the desired width and is stored in a solution of 6% sodium chloride, 0.6% lactic acid and 1% calcium chloride.

Among other things such procedure results in waste due to the necessity to cut the ribbon. Also, the use of 1% calcium chloride in a storage medium results in a bitter taste.

Alginate Industries Ltd. of London, England has published research disclosures Nos. 12154 and 13427 in Research Disclosure for May, 1974 and June, 1975 describing a process for preparing a stuffing material from pimiento (sweet pepper) as follows: Waste pimiento material, referred to as "off cuts", is macerated to produce a pulp and 300 grams of this pulp are mixed with 100 grams of a 3% solution of soluble alginate such as sodium alginate. Texturizing agents such as starch may be added; also guar gum may be added to minimize weight loss on storage. The pulp, with the added ingredients if so desired, is placed in a mold and immersed in a calcium chloride solution and is thereby converted to a tough elastic gel.

In Becker U.S. Pat. No. 4,141,287 (filed Sept. 15, 1977 and therefore not prior art as to this application) describes a procedure in which a mixture of pimiento, water, dextrose, sodium alginate, guar gum, paprika and calcium chloride are shaped by moving belts and exposed to a calcium chloride solution.

Prior to our invention, insofar as we know, no one despite numerous efforts such as those described above has succeeded in producing an olive stuffing material from the pulp of pimiento flesh which meets exacting demands such as dimensional stability of ribbon prepared from the pulp and toughness and resilience sufficient to allow normal manipulating, storage, folding and stuffing and retention of the folded segments in the pitted olive, also a pleasant flavor and mouth feel.

It is an object of the present invention to provide an olive stuffing material from macerated pimiento flesh, and to produce a ribbon therefrom which is superior to those that have been available heretofore.

Another object of the invention is to provide a reconstituted pimiento paste or puree containing macerated pimiento flesh, alginic acid and a starch and/or a gum which is capable of being molded continuously into a ribbon having the cross-sectional shape and dimensions required for stuffing olives without the need to form a wide strip and to slice it into strips of the desired width, and which will retain its shape and dimensions in cross section.

It is a particular object of the present invention to provide a reconstituted pimiento stuffing in ribbon form suitable for processing in an olive stuffing machine to stuff olives, such ribbon requiring only a short period of exposure to a gelling solution of calcium chloride, having dimensional stability, having adequate toughness to sustain handling and to be folded 180° during stuffing without damage and having a proper and acceptable mouth feel when consumed, which is stable both in ribbon form before stuffing and when stuffed into olives and packed in brine and which has a resilient quality or elasticity which causes it, when cut into strips and folded and inserted in folded condition into the cavities of pitted olives, of springing back and expanding against the walls of the cavity and thereby firmly wedging itself in place.

The above and other objects will be apparent from the ensuing description and the appended claims.

We have achieved such objects by providing a puree or paste of pimiento flesh (red or green but preferably red), forming with it a paste containing sodium alginate (preferably an alginate containing more than 50% of mannuronic acid), starch and/or a vegetable gum such as guar gum (preferably using both starch and guar gum) and an acid sufficient to provide a pH of 4.5 or less, preferably 4.0 or less. Such a paste can then be molded, preferably continuously and by a method and using apparatus described in detail hereinbelow, into a ribbon having the desired shape and dimensions in transverse cross-section. Such a ribbon, if prepared in accordance with the preferred embodiment of our invention, will be dimensionally stable and will have the attributes described above suiting it for storage in calcium chloride (e.g., 0.05% calcium chloride) brine or for immediate use in an olive stuffing machine.

The following detailed description will serve to illustrate the practice and advantages of the invention.

Source of Pimiento Material—The pimiento material or ingredient may be fresh pimiento flesh (i.e., the flesh, with or without its skin, after separation from stems and seeds), or it may be canned pimiento flesh or pimiento that has been cured in brine, also frozen pimiento (after thawing) or dehydrated pimiento after reconstitution by adding water, or any other form of pimiento which can be pureed. Pimiento that has been stored in sodium chloride solution (brine) should be desalted by washing with water. Further, the pimiento may be the whole pimiento (minus seeds and stem) or it may be cut into any of various sizes. Canned pimiento as available on the market is suitable. Mixtures of any two or more such varieties of pimiento are suitable.

The pimiento or Spanish pepper is a solanaceous fruit belonging to the same family as tomatoes and eggplant. For stuffing olives it should be red ripe, although it will become apparent the invention is appicable to green pimiento.

Pureeing of Pimiento—The pimiento is pureed in any suitable manner, e.g., in what is known as a Fitz mill, the disintegrated flesh being forced through a screen, e.g., a 0.040 inch mesh screen.

Preparation of Material from Pureed Pimiento—This pureed pimiento is mixed, preferably in the manner described below, with a soluble, food grade alginate and with a food grade thickener such as a modified starch and/or a vegetable gum.

The mixture also includes an acid which may be a non-toxic mineral acid such as HCl but preferably an acceptable food additive organic acid such as citric acid and/or lactic acid. The acid is used in quantity sufficient to provide a pH of 4.5 or less, preferably 4.0 or less. Flavor and preservative (food-grade) are added as desired.

The product so prepared is a viscous material somewhat like tomato paste in a form which can be supplied through a metering pump to a feed nozzle for ejection onto a casting wheel as described below with reference to the drawings. This paste may be extruded onto a casting wheel at room temperature or at a moderately elevated temperature, e.g. 120° F.

A preferred formulation and procedure are as follows:

TABLE I

| Ingredient | Amount (Percent by Weight) |
| --- | --- |
| (1) Water (tap) | 53.6 |
| (2) Pimiento | |
| (a) Desalted | 20 |
| (b) Canned | 20 |
| (3) Sodium alginate (Keltone) | 2.4 |
| (4) Modified starch | 1.7 |
| (5) Guar gum | 0.85 |
| (6) Lactic acid (88%) | 1.00 |
| (7) Citric acid | 0.2 |
| (8) Pimiento flavor | 0.15 |
| (9) Preservative (potassium sorbate) | 0.05 |
| (10) Vitamin C | 0.05 |
| Total | 100.00 |

The pimiento ingredients 2(a) and 2(b) were, respectively, commercially available pimiento cured in brine and desalted by thoroughly washing with water and canned pimiento. The mixture was placed in a Fitz mill and forced through a 0.040 inch screen to provide a puree.

The citric acid, vitamin C and potassium sorbate (used as a preservative), were added to the water (at 200° F.) in a ribbon blender. The alginate, starch and gum were blended dry and the resulting dry blend was added slowly to the water containing the citric acid, vitamin C and sorbate, with the blender in motion. A uniform blend was produced to which the pureed pimiento was added. Then, lactic acid and flavor were added. The blender was continued in operation to provide a uniform blend having a consistency similar to that of tomato paste. The product had a pH of 3.6.

This mixture is then placed in a tank which is pressurized by air to 20 psi and metered through a pump to a casting wheel. Apparatus suitable for the purpose is illustrated in the accompanying drawings, in which:

Figure 1:
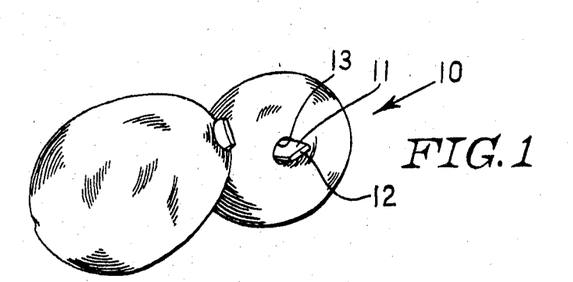
FIG. 1 is a perspective view of stuffed olives.

Referring now to FIG. 1, typical stuffed olives are there shown, being designated generally by the reference numeral 10 and comprising stuffing material 11 in cavities 12 formed by an olive-pitting machine. As stated above, the machine used for stuffing is preferably a combined pitting and stuffing machine which both pits the olives, thereby forming the cavities 11 and cutting the ribbon of stuffing material into slices, and folding the slices to form the stuffing 12.

Figure 2:
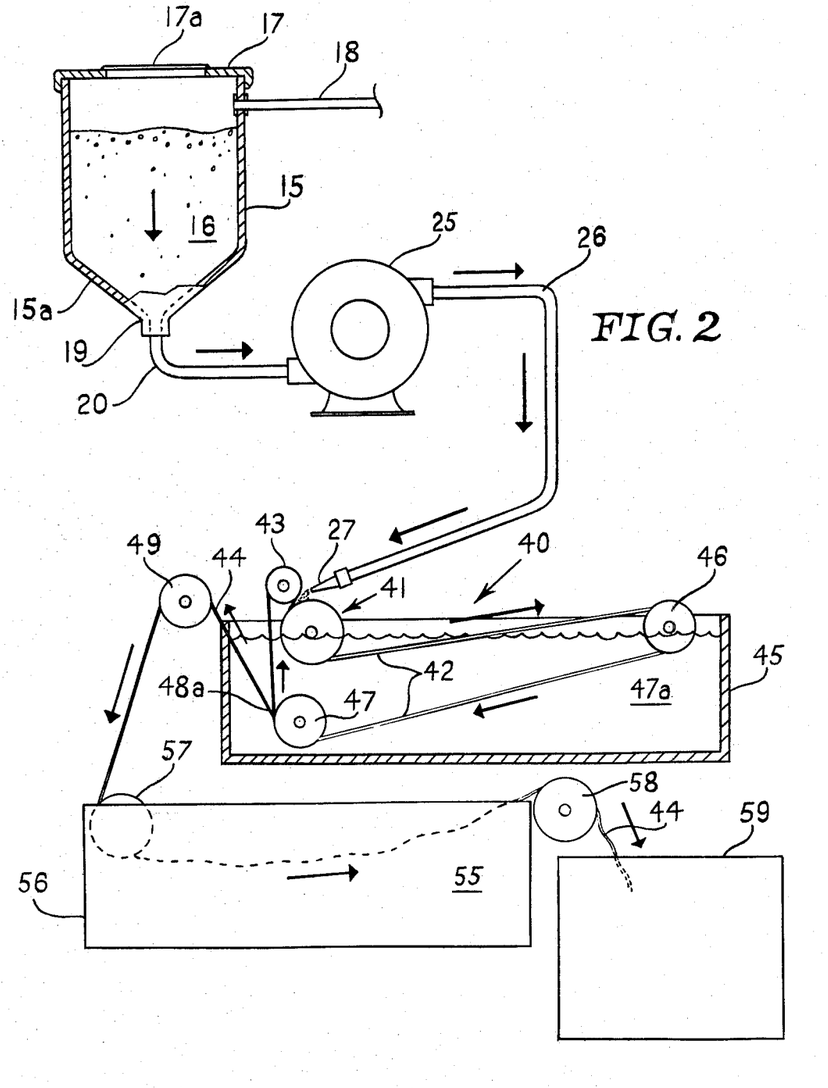
FIG. 2 is a diagrammatic view of equipment illustrating also a process for preparing the stuffing material in the form of a strap or ribbon.

Referring now to FIG. 2, apparatus is there shown which is generally designated by the reference numeral 14. This apparatus comprises a tank 15 containing stuffing material 16 which is prepared as described herein below. The tank is provided with a cover 17 with a removable lid 17a through which the stuffing material 16 is introduced. A pipe is shown at 18 through which air or other gas under pressure is introduced into the tank to pressurize the contents of the tank. The tank has a conical bottom 15a and an outlet tube 19 connected to a line 20 which is connected to the inlet of a metering pump 25. The metering pump may be of any suitable design, a number of which are well known, which meters the stuffing material 16 and feeds it at a controlled rate (depending upon the speed of the pump) to an outlet line 26, thence to a feed nozzle 27.

Figure 5:
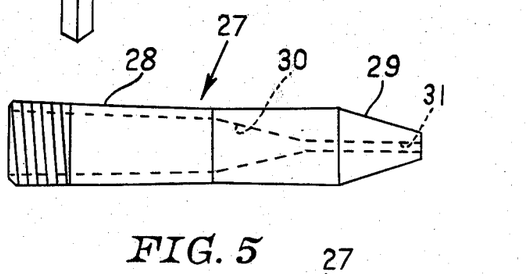
FIG. 5 and 6 are side elevation and end (as seen from the right of FIG. 5) views, respectively, of a feed nozzle.
Figure 6:
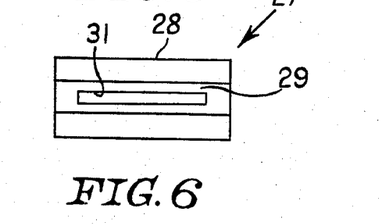

The nozzle 27 is shown in FIGS. 5 and 6. It has a threaded body 28, a tapered tip 29, a tapered passage 30 and a rectangular passage 31. Although the shape and dimensions of the passage 31 conform generally to the shape and dimensions of the ribbon 44 of stuffing material (see below) such is not essential, the nozzle 27 being merely a feed control device and the ribbon 44 being shaped as explained below.

Figure 4:
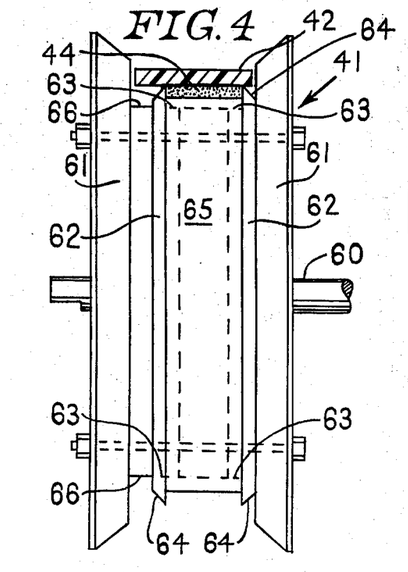
FIG. 4 is an edge view of one of the casting wheels employed in the apparatus of FIGS. 2 and 3.

Apparatus generally designated by the reference numeral 40 receives and processes the stuffing material ejected by the nozzle 27. This equipment includes a casting wheel 41, details of which are shown in FIG. 4, and are described herein below. A continuous belt 42 is provided which is of a suitable width and thickness and may be constructed of any suitable material. A typical width is 3 inches and a typical thickness is ⅛ inch and a typical material is a plastic covered fabric of food grade This belt 42 is guided over an idler wheel 43 to the casting wheel 41 and stuffing material 16 is ejected by the nozzle 27 into the angle between the belt 42 and casting wheel 41 so that it forms a layer or strip on the wheel. That layer is shown in cross section at 44 in FIG. 4 and in edge view in FIG. 2 detached from the belt 42. The belt 42 travels around the casting wheel 41 downwards into and then upwardly out of a tank 45 to a drive wheel 46, thence downwardly again into the tank to another guide wheel 47 and up again to the idler wheel or pulley 43. The tank 45 is filled with a suitable calcium chloride solution such as that described hereinbelow, the solution being indicated by the reference numeral 47a.

The ribbon 44, by this time suitably set and hardened, is separated from the belt 42 at 48a and it passes over a guide wheel 49 and into a second body of calcium chloride solution 55 in a tank 56. A roller 57 guides the ribbon or strip 44 into the bath 55, giving the ribbon its final cure. The ribbon 44 passes out of this bath over a wheel 58 into a holding container 59 for subsequent processing in an olive stuffing machine such as is referred to hereinabove.

Referring now to FIG. 4, the casting wheel 41 rotates freely on shaft 60. Its components are belt guides 61, side plates 62 having shoulders 63 and knife edges 64, a ring 65 and a spacer plate 66. The spacer plate is selected to space the belt guides apart to fit the belt 42. The side plates 62 fit within the ring 65, the knife edges 64 project above the ring 65 to define the initial thickness of the ribbon 44 and the spacing of the knife edges 60 define the initial width of the ribbon 44, which can be varied by using rings 65 of different widths. The final thickness and width of the ribbon 44 will depend upon the shrinkage of the ribbon. The knife edges also serve to trim away excess material 16.

The ribbon 44 is indicated in FIG. 2 as clinging to the belt 42, but in actual fact it floats in the calcium chloride solution and the action of the belt is largely that of forming the ribbon in conjunction with the casting wheel 41 and of guiding it through the solution.

The calcium chloride solution in tank 45 is chilled, e.g., to 40° F., and is a 7 to 10% $CaCl_2$ solution having a pH close to 7. The ribbon 44 has acid components (citric and lactic acids) which serve to convert the alginate to alginic acid. To the extent that the acids are leached out of the ribbon 44 by the calcium chloride solution they diminish the pH of the solution. Therefore, it is desirable to remove some of the calcium chloride solution and to replenish it with fresh solution, which may be carried out continuously or discontinuously to maintain the pH at about 5.5 to 7.

The solution in tank 56 is at room temperature and is a 6 to 10% $CaCl_2$ solution. Its pH is kept at not less than 5, e.g., about 6, by removal and replenishment either continuously or discontinuously.

The action of the solution in tank 45 is to gel and harden the outer layers of the ribbon by converting the alginic acid to calcium alginate, then gel and harden the interior of the ribbon by the same mechanism. The reduced temperature of the solution in tank 45 also acts to congeal the paste as it enters the solution on the casting wheel 41 so that it will remain on or close to the undersurface of the upper reach of the belt 42. By the time the ribbon reaches the lower reach of the belt it is sufficiently hardened so that it will float and retain its shape.

It will be apparent that the layer, strip or ribbon 44 of material formed by the casting wheel 41 and on the belt 42 in the manner shown in FIGS. 2 and 4 and described above is exposed on all its surfaces to the calcium chloride solution 47a at the instant when the material 16 is ejected from nozzle 27 into the V between the belt and the casting wheel. The casting wheel is at all times partially submerged in the solution 47a, therefore the exposed surface or periphery of ring 65 and the inner surfaces of the knife edges 64 projecting above the ring 65 are at all times wetted by the solution 47a. This exposure of the surfaces of the ribbon to a calcium chloride solution from the instant that the material is extruded has the effect, aided by the chilling effect described above, of quickly hardening the outer surfaces of the ribbon. This hardening is sufficient to preserve the shape and dimensions of the ribbon 44 until the solution has had time to penetrate into the interior of the ribbon and to form a ribbon which can be handled and which has a tear strength and other properties as described below. Yet the hardening of the surfaces of the ribbon is not such as to prevent or unduly inhibit penetration of the calcium chloride solution into the body of the ribbon. This balancing of (1) surface hardening sufficient to preserve shape and dimensions during preliminary handling against (2) surface reaction of a character to prevent or unduly inhibit penetration of the body of the ribbon by the calcium chloride solution, is aided by the sequestering action of the lactic and citric acids as described below.

The citric and lactic acids provide acidity to convert the alginate to alginic acid and they also sequester the calcium in the solution so that it does not act too quickly on the alginic acid (which is the gelling, hardening or setting reaction). A fast reaction of the calcium ions with the alginate tends to form a tough, impenetrable film or skin on the surfaces of the ribbon which precludes or unduly retards penetration of the calcium ions into the interior of the ribbon, therefore interferes with proper curing of the ribbon. Further, overly fast reaction of the calcium ions with the ribbon tends to cause exterior dehydration and deformation of the ribbon.

Desirably, the ribbon 44 has a tear strength of 150 to 300 grams measured as follows: A ¼ inch strip is cut from the ribbon and held by a Chatillon pressure tester and the free ends are then pulled until the strip tears. The force at tear, read in grams, is noted. The Chatillon tester is well known in the food processing industry and is normally used to measure softness of penetrability but it is adapted to measure pull and tear. Ribbon prepared from the material and by the method of the present invention has a tear strength, so measured, of about 150 to 300 grams, as compared to a competitive ribbon having a tear strength, similarly measured, less than 150. Greater tear strengths are not needed and may result in a ribbon which is too tough.

The return feature shown in FIG. 2 wherein the ribbon passes twice through the solution in tank 45 is convenient from the standpoint of size, but a longer tank with no return of the ribbon may be employed. As noted above a balance is desired and is obtained between (1) overly rapid reaction of the calcium ions with the alginic acid in surface layers such as would unduly impede penetration of calcium ions into the body of the ribbon and (2) sufficiently rapid gelling whereby the ribbon is sufficiently firm and self sustaining to be handled. The calcium ions will penetrate the body of the ribbon and will complete the gelling action. The balanced, controlled, phased gelling and hardening of the ribbon is aided by the chilling effect of the solution 47a and by the sequestering action of the citric and lactic acids.

Figure 3:
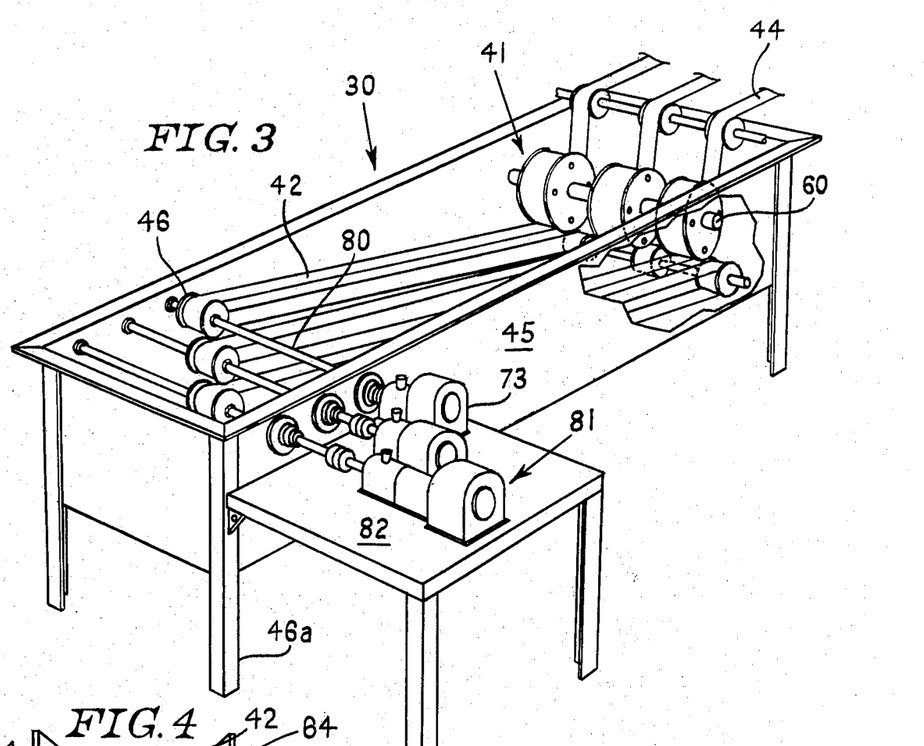
FIG. 3 is a perspective view of the casting apparatus shown in more detail than in FIG. 2.

As shown in FIG. 3, the tank 45 is supported on legs 46a and at one end (the right-hand end as viewed in FIG. 3), it will be seen that the shaft 60 carries three casting wheels 41 which are free wheeling on this shaft. The number of casting wheels will, of course, vary according to needs and preferences.

At the other end the guide wheels 46 are shown supported on shafts 80. Variable speed drive motors 81 are supported on a table 82 which drive the several shafts 80 and the guide wheels 46 at the desired rate. This rate determines the rate of ribbon formation and is coordinated with the speed of metering pump 25.

Reverting now to the formulation of the material 16, the basic ingredient or substrate is pimiento flesh. By pimiento flesh is meant the shell surrounding the seeds and interior portion and which in turn is covered by a skin. The skin may be removed, but it is preferred to retain it.

The alginate employed in the formulation set forth above was a product of Kelco Company of San Diego, California, known as Keltone. It is a low calcium-sodium alginate. As is well known, alginates are salts of alginic acid and include sodium, potassium, ammonium and magnesium salts or salts formed by alginic acid with other cations that do not precipitate the alginic acid in aqueous media. Alginic acid is derived from kelp and is a polysaccharide consisting largely or entirely of copolymers of mannuronic acid and guluronic acid, the polymer chains being inter-bonded by water molecules. For purposes of the present invention, any water soluble alginate may be used which is acceptable as a food additive, but sodium alginate is preferred. However, it is preferred to use an alginate such as Keltone which predominates in mannuronic acid. Reference is made to a publication of Kelco Co. entitled "Kelco/Algin/Hydrophilic derivatives of alginic acid for scientific water control", Second Edition at pages 7 to 9 under the heading "Structure" and more particularly to Table 2 on page 7 which is reproduced below.

TABLE 2

MANNURONIC ACID (M) AND GULURONIC ACID (G) COMPOSITION OF ALGINIC ACID OBTAINED FROM COMMERCIAL BROWN ALGAE

| Species | Mannuronic Acid Content (%) | Guluronic Acid Content (%) | M/G Ratio | M/G Ratio Range |
|---|---|---|---|---|
| Macrocystis pyrifera | 61 | 39 | $1.56^a$ | — |
| Ascophyllum nodosum | 65 | 35 | $1.85\ (1.1)^a$ | $1.40–1.95^b$ |
| Laminaria digitata | 59 | 41 | $1.45^a$ | $1.40–1.60^b$ |
| Laminaria hyperborea (stipes) | 31 | 69 | $0.45^a$ | $0.40–1.00^b$ |
| Ecklonia cava and Eisenia bicyclis | 62 | 38 | $1.60^a$ | — |

[a]Data of Haug (1964) and Haug and Larsen (1962) for commercial algin samples. Of the two ratios shown for *Ascophyllum nodosum*, the algin sample manufactured in Canada has the higher M/G value; the lower ratio corresponds to a European sample.
[b]Data of Haug (1964) showing the range in composition for mature algae collected at different times at each of several locations.

Reference to Table 2 shows that alginic acid obtained from five of the six species of brown algae shown in the Table contain 59, 61 and 65% mannuronic content, the balance being guluronic acid content and that alginic acid derived from one species namely, *Luminaria hyperborea* contains only 31% of mannuronic acid and 69% of guluronic acid. (Percentages are mol percent. The guluronic acid is L-guluronic acid and the mannuronic acid is D-mannuronic acid.)

The Keltone in Table 1 above was derived from *Macrocystis pyrifera* and is the preferred form of alginic acid for purposes of the present invention. However, alginates derived from any of the other species of brown algae containing more than 50% mannuronic acid may be used. Those derived from algae containing less than 50% mannuronic acid may be used and will benefit from the procedures and formulation of the present invention, e.g. the use of a low pH, of citric and lactic acids and of a gum and a starch, and the wetting of the ribbon from the time it is first formed and the continued exposure of the partially gelled ribbon to the calcium chloride solution after it leaves the casting wheel. However, we have found that ribbons made in accordance with the present invention and using an alginate containing substantially more mannuronic acid than guluronic acid, e.g. 55% to 75% mannuronic acid is preferable.

Alginates containing less than 50 mol percent mannuronic acid (more than 50 mol percent guluronic acid) have been used in the formulation of the present invention and have been compared with those containing more than 50% mannuronic acid, with results as follows:

Protanol S. F. 120, a trade name of Protant Faertan A.S. Drammer, Norway was employed. This was an alginate containing more than 50% guluronic acid. It was formulated in the manner described above with reference to Table 1. Although the resulting product would be acceptable for some uses not as exacting as the requirements for stuffed olives, it was inferior to product prepared in accordance with the preferred embodiment of the present invention and using an alginate such as Keltone, in the following respects: The fluid mixture such as that shown at 16 in FIG. 1 did not form a good gel on cooling unless calcium chloride was added; whereas the product of the preferred embodiment of the invention forms a soft gel even without the addition of calcium chloride. With calcium chloride the Protanol S. F. 120 product took longer to form a firm gel than the Keltone gel; the Protanol gel was not as elastic as the Keltone gel and was more brittle and more likely to break when bent 180°; and when packed in 7% sodium chloride brine with added calcium chloride to suppress leaching of calcium and added lactic acid added as a pH adjustment the ribbon strength deteriorated in five days to zero strength as measured by a Chatillon gauge-R tester whereas Keltone ribbon under the same conditions had a strength of 250 grams.

Samples of high (>50%) mannuronic acid alginate (Manucol DM and Manucol DMF) and of high (>50%) guluronic acid alginate (Manugel DMB) were obtained from another source (Alginate Industries Ltd. of 22 Henrietta Street, London, WC2E 8NB, England) and used in the manner described with reference to Table 1. The high guluronic ribbon made with Manugel DMB was brittle and lost strength rapidly whereas the high mannuronic ribbon made with the Manugels were not brittle, did not lose strength or deteriorate rapidly and were comparable to ribbons made with Keltone. The Manugel and Manucol alginates were derived from sources other than *Macrocystis pyrifera.*

Thus the ribbon prepared in the manner described herein from the formula of Table I has the following valuable attributes: The ribbon is dimensionally stable and preserves its cross sectional dimensions. Therefore when it is cut into strips, even after prolonged storage, the strips are uniform and when folded and stuffed into cavities in pitted olives, the fit is proper, i.e. the folded strips are not oversized or undersized. The taste of the ribbon and of strips cut from the ribbon is good and retains its quality. Also the tactile quality and firmness are good and are stable. When packed in 7% calcium chloride plus 0.5% lactic acid plus 500 ppm calcium chloride aqueous brine (which has the NaCl concentration of brine normally used for packing Spanish olives) these desirable qualities are retained over long periods of time.

The gum and starch serve as thickening agents. The gum also confers a resilience to the ribbon which is helpful in that it allows the folded strips cut from the ribbon to be stuffed into the cavities of olives under compression and to expand within the cavities and be firmly held in the cavities. Any food grade vegetable gum which is capable of acting as a thickening agent may be used. The starch (ingredient 4) was a product of National Starch and Chemical Corporation of 750 Third Avenue, New York, New York, known as Instant Clearjel, and is described in literature of that company as a pre-gelatinized, modified and stabilized waxy maize food starch which thickens instantly in cold water. The particular gum used (guar gum) is obtained from the endosperm of seeds of the plant *cyanopsis tetragonalobus.* The gum and starch may be omitted where the material is thick enough without them but they are preferaby present in the material.

The ribbon thus produced has a number of advantages including the following: It is dimensionally stable. As noted above, it undergoes shrinkage but the ribbon coming from the tank 56 is uniform in width and thickness; therefore, allowance can be made for shrinkage. It has an adequate (150 to 300 grams) and uniform tear strength and it is free of discontinuities, voids, thin spots and lumps. It has the proper texture for olive stuffing and it has good storage properties, e.g., it does not deteriorate on storage and in the olives and it retains its good qualities in olives over long periods of time. The ribbon after leaving tank 55 may be stored for long periods of time (for example one year) by storing it in a conventional brine used for packing stuffed olives, for example, an aqueous sodium chloride solution containing 7% sodium chloride and 0.5% lactic acid, such brine being commonly used for packing Spanish olives. Preferably the brine also contains 500 parts per million (500 ppm) of calcium chloride if the ribbon is to be stored for a long period of time. The calcium ions inhibit the leaching of calcium ions from the ribbon by the brine and replacement by sodium ions. Such would be detrimental to the quality of the ribbon. Such quantity (500 ppm) of calcium chloride is not only suitable for this purpose but is tolerable from an organoleptic standpoint. A greater, for example, 1000 ppm quantity of calcium chloride is objectionable because it imparts a bitter taste to the olive. An important advantage of storage in a 7% NaCl plus 0.5% lactic acid plus 500 ppm calcium chloride brine is that it is the same (except for calcium chloride) as the brine in which the stuffed olives are packed, therefore the ribbon does not require soaking in fresh water to leach out excess sodium chloride or calcium chloride.

The end product (stuffed olives) benefits by these and other properties of the ribbon. For example, according to Kyros U.S. Pat. No. 4,006,256 the stuffed olives are packed in a 10% sodium chloride solution. Such a high concentration of sodium chloride is unacceptable from the standpoint of taste. Further the stuffing prepared from the ribbon of the present invention retains its feel, taste and springy quality and does not become mushy. Accelerated tests simulating three years of storage of stuffed olives made in accordance with the invention have shown that the product has a shelf life of at least three years and has not during such period of time experienced deterioration to any significant degree.

In the description above, the formation of a ribbon has been emphasized because this ribbon can be fed to a commercially available stuffing machine which slices the ribbon into strips about ¼ inch wide and 1⅛ inches long (the latter dimension being the width of the ribbon), folds the severed strips in half and stuffs the folded strip into the cavity of an olive. However, the material 16 may be cast or molded into wider sheets by the use of a wider casting wheel 41 and a wider belt 42 and the sheet may be sliced to suitable widths. Also other methods of forming a ribbon (or a sheet which can be sliced into ribbons) may be employed.

Some General Observations

The proportions of ingredients in the material which is to be molded and gelled may vary between fairly wide limits, e.g., as follows:

| | | | | |
|---|---|---|---|---|
| Pureed pimiento flesh | 20 | to | 80% | by weight |
| Alginate | 2 | to | 4% | by weight |
| Thickeners | 1 | to | 4% | by weight |
| pH | 2.5 | to | 4.5, | preferably to 4.0. |

The alginate is preferably one containing in excess of 50% mannuronic acid. The acid pH is produced by adding a non-toxic, food grade acid such as lactic acid and/or citric acid. A mineral acid, if acceptable as a food ingredient, e.g. HCl may be used. However, organic acids are preferred, especially carboxylic acids such as lactic and/or citric acid, which by their chelating effect have a desirable sequestering effect on the calcium as explained above.

We have found that a low pH contributes greatly to the desired qualities of ribbon resulting from casting or molding the pasty material and causing it to gel and cure. At the preferred low pH, much more of the alginate is in the protonated form HA (where H represents hydrogen and A represents the alginate moiety) and correspondingly less is in the ionic form $A^-$. That is, the equilibrium of the reversible reaction $$HA \rightleftharpoons H^+ + A^-$$

is displaced more to the left favoring HA by decreasing the pH, i.e., increasing the acidity. We have found that by suppressing the formation of the alginate ion $A^-$ several advantages accrue.

Among these advantages are the following: The pasty material, when molded, cooled and subjected to contact with calcium chloride solution, gels and quickly becomes an adequately tough, uniformly gelled product having dimensional stability. This dimensional stability is preserved and continues during storage before it is used to stuff olives and after it is stuffed into olives. The ribbon can be used immediately for stuffing olives after no more than a few minutes residence in a calcium chloride solution or it can be stored in a solution containing sodium chloride and calcium chloride. The ribbon can be cut into segments and the segments can be folded 180° and inserted into the cavities of pitted olives without breaking. The folded segments have a springy, resilient quality such that when lodged in the cavities of pitted olives, they will spring apart and cause the folded segment to wedge firmly in the cavity.

By way of contrast, if the same formulation is used at a higher pH, dimensional stability will suffer and a ballooning effect (a shrinkage in diameter of a disc-like specimen and an increase in its thickness) will result. These phenomena are illustrated by the following examples, by Table 3 and by FIGS. 9, 10 and 11.

EXAMPLE 1

To a mixture (heated to 180° F.) of 100 g desalted pureed pimiento and 135 ml of tap water was added while stirring in a Waring blender a mixture containing 6.0 g of Keltone, 4.2 g of instant Clearjel and 2.1 g of guar gum. One sample had no acid added, to another HCl was added, and to another, citric and lactic acids were added. The resulting mixtures were stirred for one minute. The mixtures were placed in forms consisting of caps for glass jars level with the top of the cap. The caps were 70 mm in diameter by 8 to 10 mm in depth. The caps containing the mixtures were placed in a freezer at approximately 5° F. for 10 minutes. The caps were then placed in an 8% calcium chloride solution at 30° F. After three minutes the samples were removed from the forms and placed in the calcium chloride bath for an additional 13 minutes. The samples were then placed in a brine which was 0.5% lactic acid, 7% sodium chloride, and 500 ppm calcium added as calcium chloride.

| | Acid Added | pH | Diameter 48 hrs | Thickness 48 hrs |
|---|---|---|---|---|
| A | None | 6.8 | 53 mm | 22 mm |
| B | 0.7 ml concentrated HCl | 3.6 | 63 mm | 9 mm |
| C | 0.5 g citric acid & 2.5 ml 80% lactic acid | 3.4 | 65 mm | 9 mm |
| | Gel Formation After Cooling but Before CaCl$_2$ Bath | | | |
| A | Did not gel | | | |
| B | Soft gel (set quickly) | | | |
| C | Soft gel | | | |

This example illustrates the point that at a pH of 6.8 the gelled product is dimensionally unstable; it shrinks considerably from a diameter of 70 mm to a diameter of 53 mm, and increases from a thickness of 8 to 10 mm to a thickness of 22 mm. This example also illustrates the point that a mineral acid may be used to reduce shrinkage, although it has the disadvantages of setting more quickly (i.e., at a higher temperature) before exposure to the calcium chloride bath and has slightly more shrinkage.

EXAMPLE 2

To the pimiento mix of Table 2, having a pH of 3.6, was added 50% caustic soda in varying amounts. The mixtures were first cooled in a form consisting of a lid for a glass jar 8-10 mm in depth and 70 mm in diameter. The mixtures were cooled for 10 minutes in a freezer at approximately 5° F. The samples were then placed in a 7% to 10% calcium chloride solution at 40° F. After 3 minutes the samples were removed from the forms and placed in the calcium chloride bath for an additional 13 minutes. They were then placed in a brine which was 0.5% lactic acid, 7% sodium chloride, and 1000 to 4000 ppm calcium added as calcium chloride. After two days in this brine the shrinkage and diameter readings were taken with results as follows:

TABLE 3

| Sample | pH | Bostwick Consistency | Gel Formation After Cooling and Before Calcium Chloride Bath | Gel Thickness | Diameter | Shrinkage |
|---|---|---|---|---|---|---|
| Control | 3.6 | 6.25 cm/30 sec | Soft Gel | 8 mm | 66 mm | 4 mm |
| NaOH Added to pH | 4.3 | 9.25 cm/30 sec | Very Soft Gel | 11 mm | 60 mm | 10 mm |
| NaOH Added to pH | 5.6 | 11.00 cm/30 sec | Did Not Gel | 14 mm | 53 mm | 17 mm |

The Bostwick consistency was measured at 110° F. by an apparatus and method of that name which are well known in the food industry, e.g. to measure the consistency of tomato paste. The higher the Bostwick number, the thinner or less viscous the product. The Bostwick measurements were made on the pimiento mixes before placing them in the lids.

As will be seen, the higher pH (4.3 and 5.6) mixtures were considerably less viscous and they did not gel as readily (the 5.6 pH mixture did not gel at all). The low pH mixture formed a soft gel. The low pH gel after exposure to calcium chloride solution was dimensionally stable, it shrank only 6% and underwent no appreciable increase in thickness. By way of contrast, the 4.3 pH mixture, although much better than the 5.6 pH mixture, shrank 14% in diameter and increased in thickness. (This dimensional instability is manifested by a ballooning effect; the gels shrank in diameter and swelled up about their central portions.)

Figure 9:
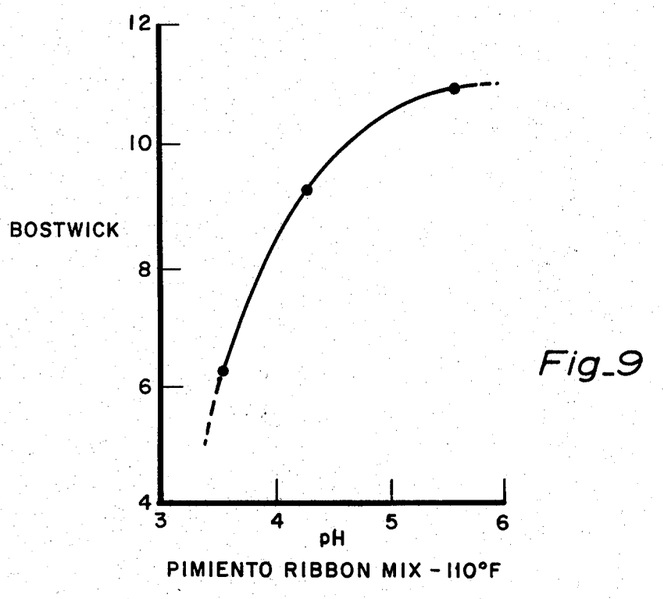
FIGS. 9, 10 and 11 are curves showing effects of pH.
Figure 10:
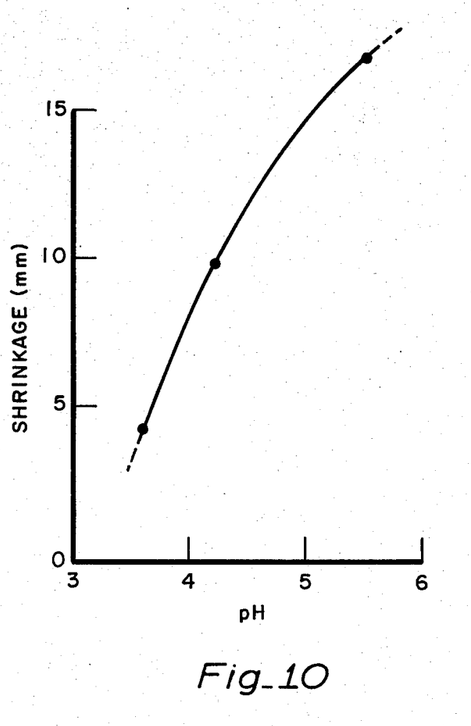
Figure 11:
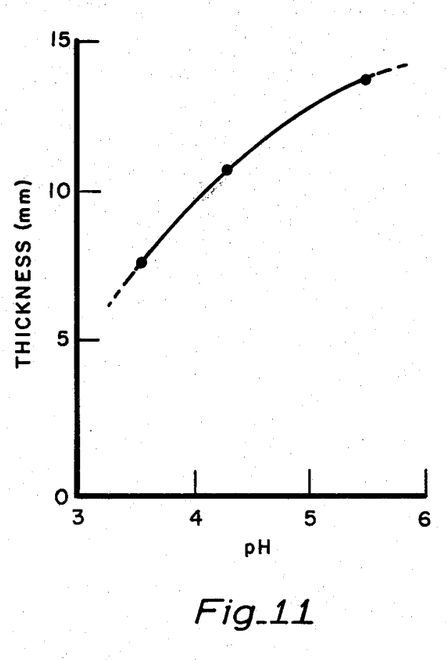

The results are also illustrated by FIGS. 9, 10 and 11. In FIG. 9 Bostwick values are plotted against pH; in FIG. 10 shrinkage in diameter is plotted against pH; and in FIG. 11 thickness is plotted against pH.

The maximum of advantages are obtained under the following conditions: The pH is 4.0 or less and above about 3.0, and results from the use of an organic acid, preferably lactic and/or citric acid. Both a starch and guar gum are present. The alginate is one which predominates in mannuronic acid, such as that obtained from *Macrocystis pyrifera*. The paste or puree is cooled to a temperature between 40° F. and the freezing point of the paste or puree before exposure to calcium chloride setting solution. Freezing is undesirable We believe that if the pH is greater (and therefore more of the alginate is in the ionized form A⁻) it reacts too quickly and completely at the surface with the calcium chloride solution and forms a thick skin which acts as a barrier to further penetration of calcium chloride; also, the material will not congeal sufficiently on cooling. This may (and we believe that it does) account for the ballooning effect and dimensional instability noted above and for the long time required in the prior art for gelling and curing. For example, in the Kyros patent one-half hour to two hours exposure to calcium chloride solution is recommended. In our preferred process wherein the molded, low pH, high mannuronic acid alginate paste is extruded, cooled and then immersed in calcium chloride solution, no impenetrable skin is formed and the calcium chloride penetrates more uniformly and causes more uniform conversion of HA to Ca⁺⁺ and A⁻. (This explanation is given by way of illustration without intending to limit the scope of the invention. The empirical facts are that providing low pH, cooling, using a high mannuronic acid alginate, and immersion of the resulting ribbon in chilled calcium chloride solution results in major benefits such as those described above.

When the end product or use does not have to meet such severe criteria, for example, where a sheet or ribbon of gelled pimiento material is to be prepared for cutting into pieces to be incorporated in food stuff as flavoring, the parameters—pH, source of alginate, etc.—may be relaxed. Thus alginate predominating in guluronic acid may be used and will benefit by the low pH feature of the present invention. Also the pH may be as high as 4.5 where dimensional stability is not as urgently required.

The apparatus shown in FIGS. 2 to 6 is preferred. However, the important features of continuous casting of the paste 16 in a mold which is wetted with a setting solution and which therefore wets the entire surface of the freshly cast material with the solution may be accomplished by other means, for example, that shown in FIG. 7.

Figure 7:
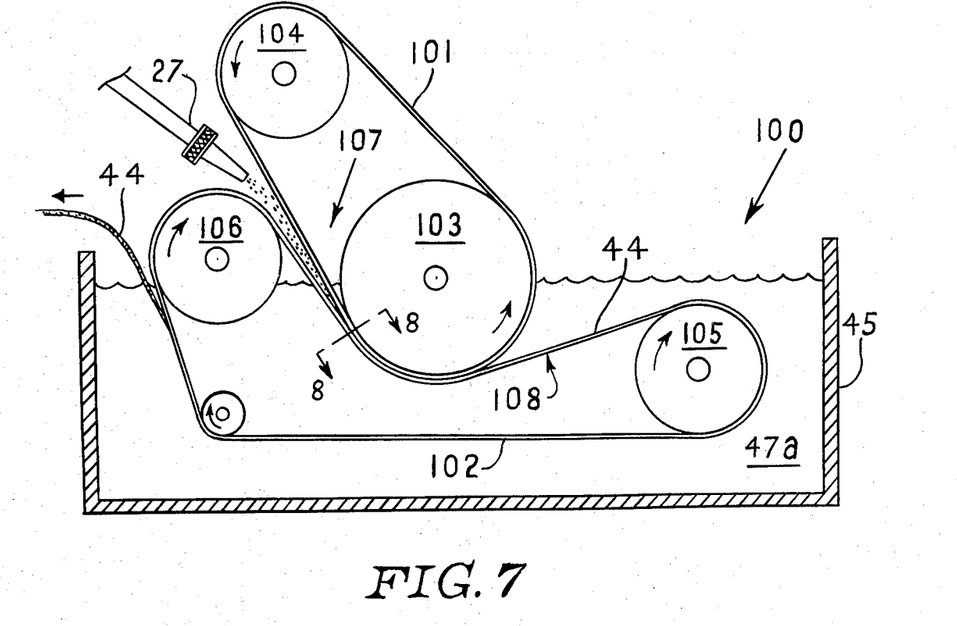
FIG. 7 is a diagrammatic view of alternative casting apparatus.

Referring to FIG. 7 apparatus 100 is shown including a tank 45 containing calcium chloride solution 47a and an extruding nozzle 27 as shown in FIG. 2. Two endless belts 101 and 102 are shown, belt 101 forming a loop around wheels 103 and 104 and belt 102 forming a loop around wheels 105 and 106. The two belts converge at 107 and the aforesaid wheels are driven to move the belts together at the same speed down into the solution 47a, then to diverge at 108 while still immersed. Food material such as the reconstituted pimiento paste described above is extruded by nozzle 27 to the belts at their point of convergence.

Figure 8:
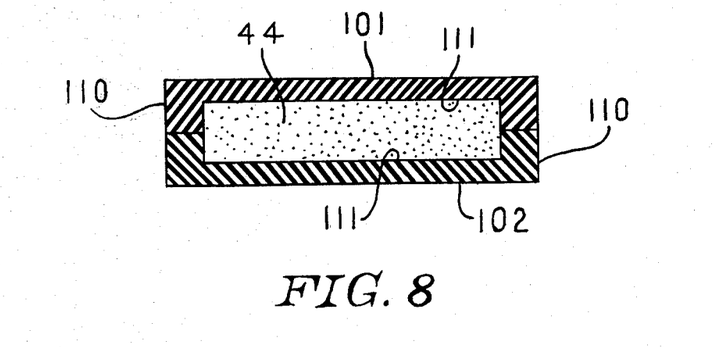
FIG. 8 is a section taken along the line 8—8 of FIG. 7.

A suitable configuration for the belts 101 and 102 is shown in FIG. 8 wherein it will be seen that each belt is formed with flanges 110 which form a groove 111. These grooves form a mold cavity of the desired shape and dimensions. It will be seen both belts are wetted by the solution, therefore the mold cavity has a film of calcium chloride solution when it is formed at 107. It will also be seen that the freshly formed ribbon continues to be exposed to the solution and to be supported by belt 102 after separation of the belts.

The casting apparatus of FIG. 2 is preferred but that of FIG. 7 may be used.

It will therefore be apparent that new and useful food products have been provided.

We claim:

1. A molded gelled body produced by gelling a composition in calcium chloride, the composition comprising a mixture of macerated pimiento flesh, a water soluble alginate, at least one of the substances starch and a vegetable gum, and an acid, said pimiento flesh constituting the major ingredient by weight, the alginate being present in quantity such that upon cooling and subjecting said mixture to contact with the aqueous calcium chloride solution it will quickly gel the mixture, the starch or gum being present in quantity sufficient to result in a gel which can be manipulated without structural damage and the acid being present in quantity sufficient to provide a pH not exceeding about 4.5, and wherein the molded gelled body is characterized by dimensional stability such that after storage for two days in a brine containing 7% sodium chloride, 0.5% lactic acid and 500 to 1000 ppm calcium chloride it exhibits substantially no change in shape and dimensions.

2. The gelled body of claim 1 wherein the alginate has a greater proportion of mannuronic acid than of guluronic acid.

3. The gelled body of claim 2 wherein the alginate is derived from *Macrocystis pyrifera*.

4. The gelled body of claim 1 wherein the pH is 4.0 or less and the acid is lactic and/or citric acid.

5. The gelled body of claim 4 containing both a natural gum and starch.

6. The gelled body of claim 1 wherein the composition and the pH are as follows (percentages by weight):

| | |
|---|---|
| Macerated pimiento | 20-80% |

| | |
|---|---|
| -continued | |
| Alginate | 2-4 |
| Starch + natural gum | 1-4 |
| pH | 2.5-4.0 |
| Water to make 100% | |

7. The gelled body of claim 6 wherein the alginate predominates in mannuronic acid and the acidifying agent is lactic and/or citric acid.

8. The molded, gelled body of claim 1 in the form of a ribbon having a cross section adapting it to be severed into segments, folded and stuffed into the cavities of pitted olives, said segments also being capable of being folded 180° without damage and having a springy quality which aids in retaining the folded segments in such cavities.

9. The molded, gelled ribbon of claim 8 wherein the alginate predominates in mannuronic acid and the pH of the mixture from which it is made does not exceed about 4.0.

10. The ribbon of claim 9 containing both a natural gum and starch.

* * * * *